E. LACE.
GAMBREL.
APPLICATION FILED MAY 26, 1911.
1,044,060.
Patented Nov. 12, 1912.
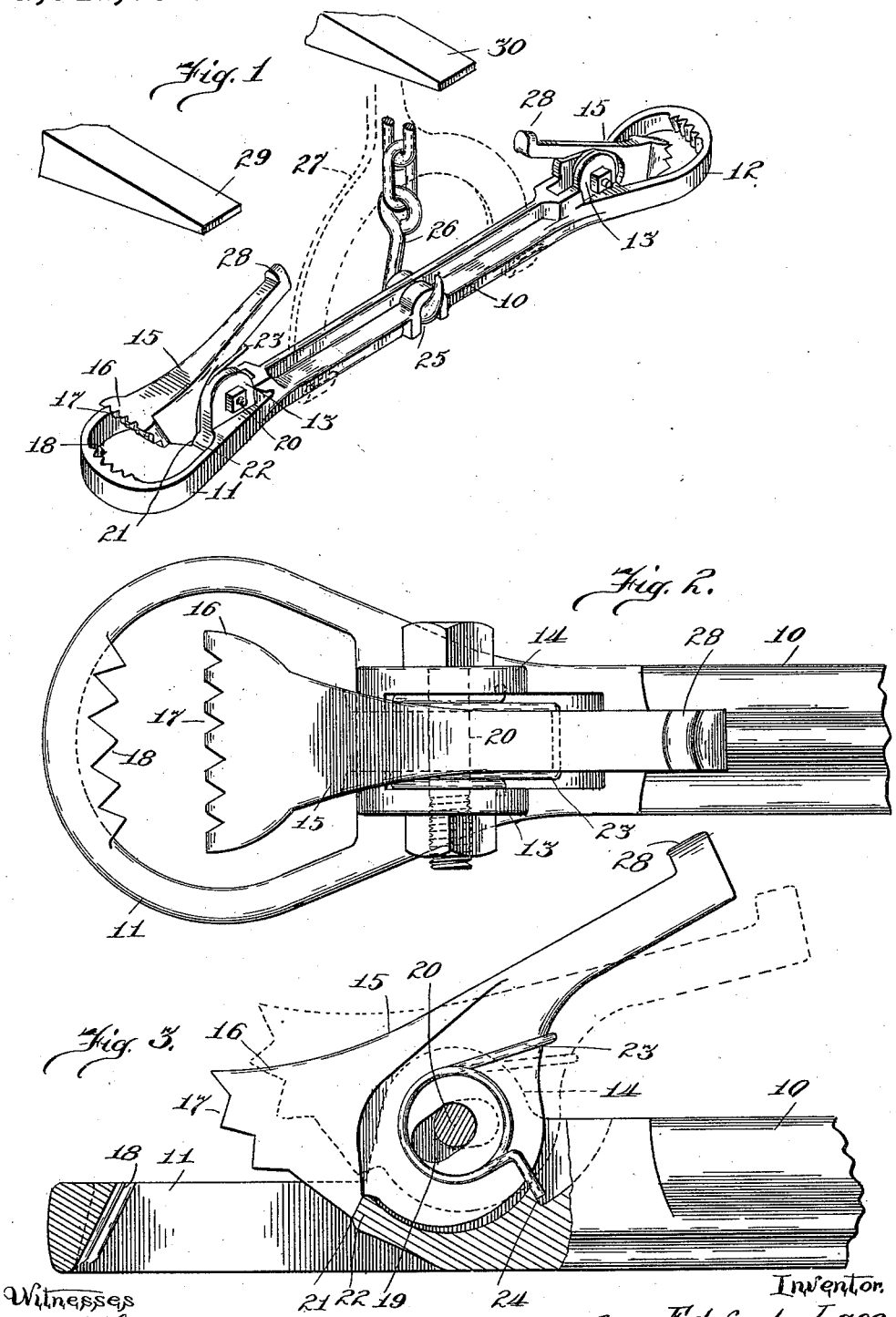
Witnesses
Milton Lenoir
E. M. Hatcher
Inventor
Edward Lace
Tilson & Tilson
Attorneys

UNITED STATES PATENT OFFICE.

EDWARD LACE, OF CHICAGO, ILLINOIS.

GAMBREL.

1,044,060.

Specification of Letters Patent.

Patented Nov. 12, 1912.

Application filed May 26, 1911. Serial No. 629,723.

*To all whom it may concern:*

Be it known that I, EDWARD LACE, a citizen of the United States, and resident of Chicago, county of Cook, and State of Illinois, have invented certain new and useful Improvements in Gambrels, of which the following is a specification, and which are illustrated in the accompanying drawings, forming a part thereof.

The invention relates to an improved form of gambrel adapted to be used in connection with the slaughter of animals; its function being to carry the carcass by the hind legs, while being dressed and transported from place to place during the dressing operation.

The object of the invention is to provide an improved gambrel stick which will automatically grip and release the legs of the animal.

The invention consists in a structure such as is hereinafter described and as illustrated in the accompanying drawings, in which—

Figure 1 is a view in perspective of the improved gambrel and its supporting means, showing also a detail of the releasing mechanism; Fig. 2 is a detail plan view showing one end of the gambrel, and Fig. 3 is a detail longitudinal central section through one end of the gambrel, the gripping device being shown in elevation, the dotted lines showing an adjusted position thereof.

The gambrel comprises a bar 10 which may be a malleable casting and is provided at each end with a loop 11, 12, the axis of the opening of the loop being vertical when the gambrel is in position for service. Adjacent each loop there rises from the bar a pair of lugs 13, 14, between which there is pivoted a clutch bar 15, the forward end 16 of which projects over and is adapted to swing into the loop. Preferably the end 16 of the clutch member is serrated, as shown at 17, and similar serrations 18 are also formed in the inner surface of the outer end of the loop.

The legs of the carcass being thrust upwardly through the loops are gripped between the clutch member and the outer end of the loop and are thus securely held. The end 16 of the clutch member will, of course, swing down to a greater or less distance according to the size of the leg, and for the purpose of increasing the range of usefulness of the device so as to adapt it for carrying animals of various sizes, the aperture 19 in the clutch member which receives the pivot 20 upon which it rocks, is elongated, as plainly shown in Fig. 3. When a large animal is to be carried the clutch member is moved back to the dotted line position of Fig. 3. When the carcass is a small one the clutch member assumes the solid line position of Fig. 3 and is prevented from sliding back by the engagement of a downwardly projecting shoulder 21 adjacent its ends 16, with a shoulder 22 formed on the bar at the inner side of the loop.

A spring 23 coiled about the hub of the clutch member 15 and reacting between the body thereof and a shoulder 24 formed on the bar, urges the clutch member forwardly and downwardly thus normally holding it in position for engaging the leg of the smallest carcass in connection with which the gambrel is intended to be used. Midway of its length, there is formed in the under face of the bar 10, a recess 25 for receiving a supporting hook 26. The gambrel may, however, be carried by a double hook support, shown at 27 in dotted lines in Fig. 1.

In packing establishments it is customary to transport carcasses during the dressing operation from place to place by suspending them from an overhead track. When they reach a station at which it is desired to release them from the suspending device, the clutch members 15 may be thrown back automatically by the engagement of their inner ends 28 with stationary trips 29, 30. By properly inclining the under faces of these trips, which extend into the path of the inner ends of the clutch members, the releasing can be timed so as to assort the carcasses as the inner ends of the clutch members will be depressed to a greater extent by the legs of a large carcass than by those of a small carcass. The spring 23 serves both to urge the clutch member 15 forwardly and to depress its end. It will be observed however, that the forward end of the arm would be normally depressed without the spring for the weight of that part of the arm located in front of the pivot 20 is greater than that of the part located in rear of the pivot.

I claim as my invention—

1. A gambrel bar having a loop adjacent each end to receive the limb of a carcass, and a clutch member mounted on the bar adjacent each loop and normally movable into its gripping position in line with the aperture of the loop.

2. A gambrel bar having a loop adjacent each end to receive the limb of a carcass, and a clutch member pivotally mounted on the bar adjacent each loop and normally movable into its gripping position in line with the aperture of the loop.

3. A gambrel bar having apertures adjacent each end, a clutch member pivotally mounted on the bar adjacent each loop and having a longitudinally sliding engagement with the bar, the end of the clutch member being movable into line with the loop.

4. A gambrel bar having apertures adjacent each end, a clutch member pivotally mounted on the bar adjacent each loop and having a longitudinally sliding engagement with the bar, the end of the clutch member being movable into line with the loop and a stop for limiting the backward movement of the clutch member when in its advanced position.

5. A gambrel bar having a loop adjacent each end, a spring advanced clutch member pivotally mounted on the bar adjacent each loop and having a longitudinally sliding engagement with the bar, the end of the clutch member being movable into line with the loop and a stop for limiting the backward movement of the clutch member when in its advanced position.

6. In a gambrel, in combination, a bar having apertures at each end, a longitudinally movable pivoted clutch arm adjacent each end of the bar one end of each clutch arm being movable into line with the adjacent aperture, a stop for limiting the backward movement of the arm when its outer end is advanced, and a stationary trip for releasing the clutch arm.

7. In combination, a gambrel stick apertured adjacent each end to receive the limb of a carcass, conveying means engageable with the stick, a clutch arm pivotally mounted upon the stick adjacent each of the apertures, one end of each of the clutch arms being movable into line with the aperture at the same end of the stick for gripping the carcass limb inserted therein, and a trip engageable with the other end of each of the clutch arms.

8. In combination, a gambrel stick apertured adjacent each end to receive the limb of a carcass, conveying means engageable with the stick, a clutch arm pivotally mounted upon the stick adjacent each of the apertures, one end of each of the clutch arms being movable into line with the aperture at the same end of the stick for gripping the carcass limb inserted therein, the arrangement being such that the position of the other end of the clutch arm is determined by the size of the carcass limb, and a trip engageable with the other end of each of the clutch arms, the engaging faces of the said trips being oblique to the direction of travel of the stick.

9. In a holder for articles of variable size in combination, a member having a horizontally disposed gripping shoulder, a clutch arm coöperating with the said gripping shoulder, the said clutch arm being swingingly mounted upon a horizontal pivot located above the plane of the shoulder and having a limited sliding movement toward and away from the said shoulder when the inner end of the arm is elevated, and a stop for preventing backward sliding of the clutch arm when the inner end of the arm is depressed.

10. In a holder for articles of variable size in combination, a member having a horizontally disposed gripping shoulder, a clutch arm coöperating with the said gripping shoulder, the said clutch arm being swingingly mounted upon a horizontal pivot located above the plane of the shoulder and having a limited sliding movement toward and away from the said shoulder when the inner end of the arm is elevated, a stop for preventing backward sliding of the clutch arm when the inner end of the arm is depressed, and a spring acting on the clutch arm to advance it and depress its inner end.

EDWARD LACE.

Witnesses:
Louis K. Gillson,
E. M. Klatchcer.

Copies of this patent may be obtained for five cents each, by addressing the "Commissioner of Patents, Washington, D. C."